April 22, 1952 J. V. L. KEMP 2,594,033
AUTOMATIC GATE CONTROL
Filed Dec. 28, 1949 7 Sheets-Sheet 1

Inventor
JACK VOYNA LESLIE KEMP
By
Bailey, Stephens & Huettig
Attorneys

April 22, 1952 J. V. L. KEMP 2,594,033
AUTOMATIC GATE CONTROL
Filed Dec. 28, 1949 7 Sheets-Sheet 2
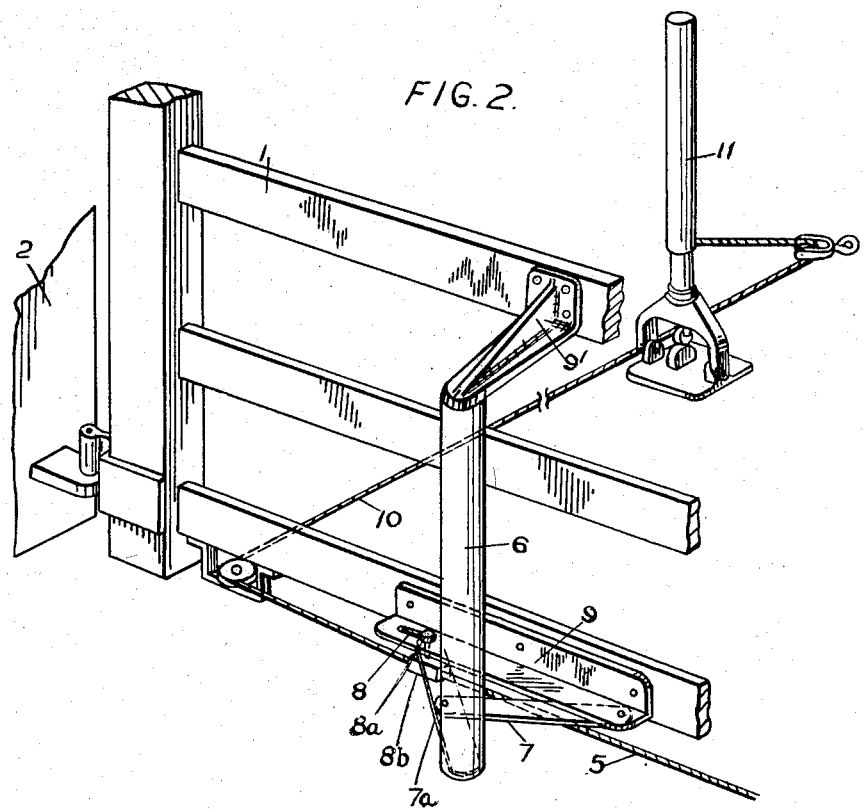
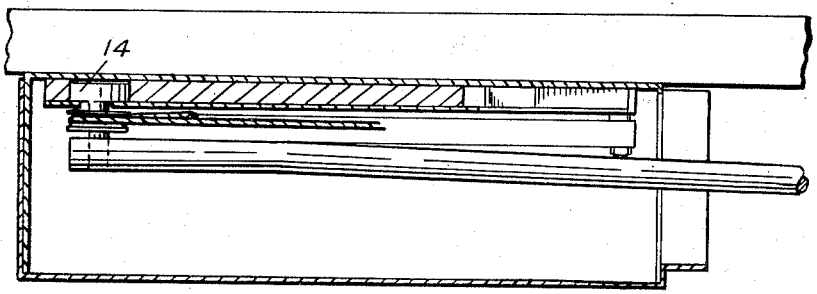

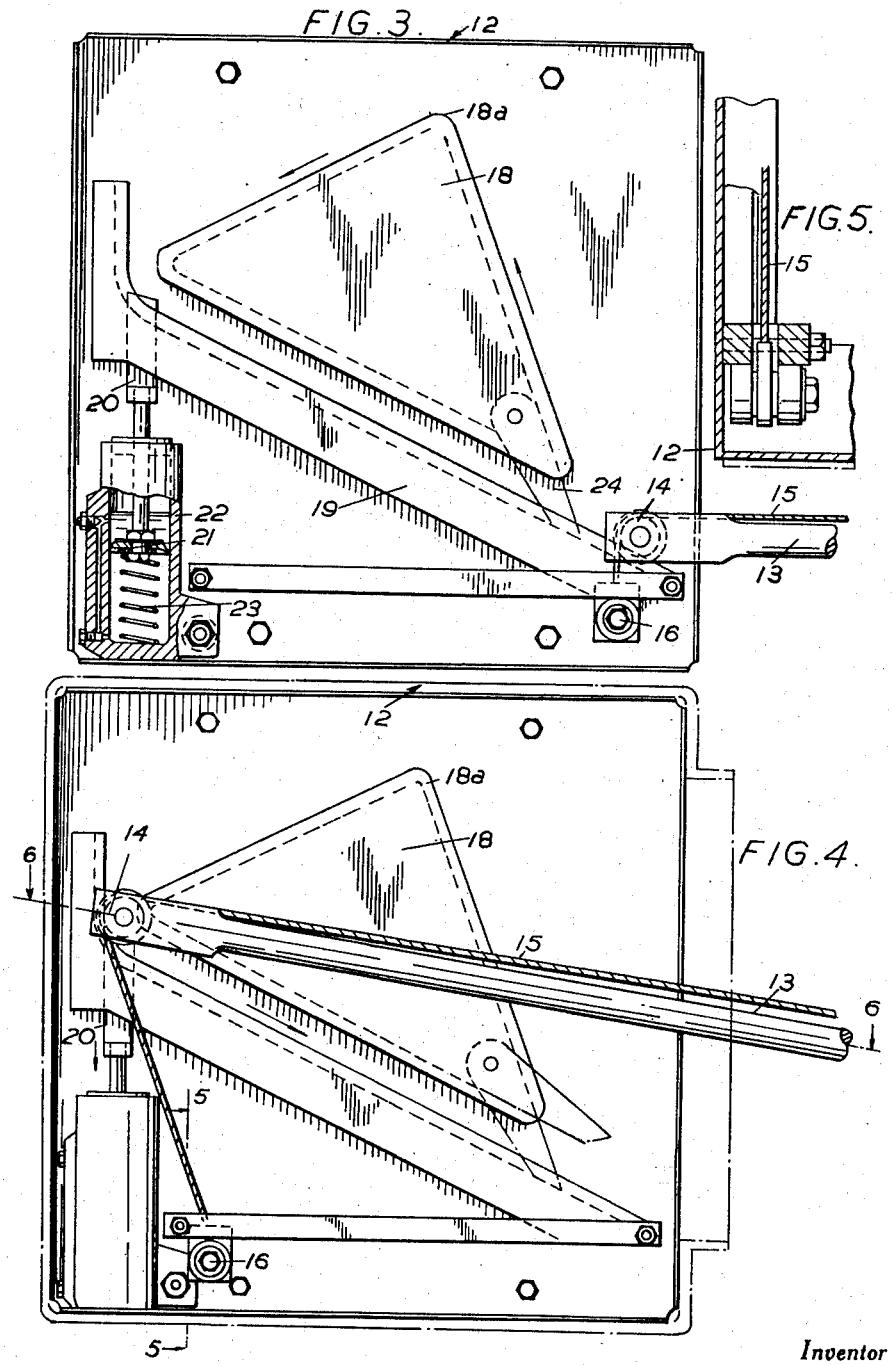

April 22, 1952     J. V. L. KEMP     2,594,033
AUTOMATIC GATE CONTROL
Filed Dec. 28, 1949     7 Sheets-Sheet 4

Inventor
JACK VOYNA LESLIE KEMP
By
Bailey, Stephens, Huettig
Attorneys

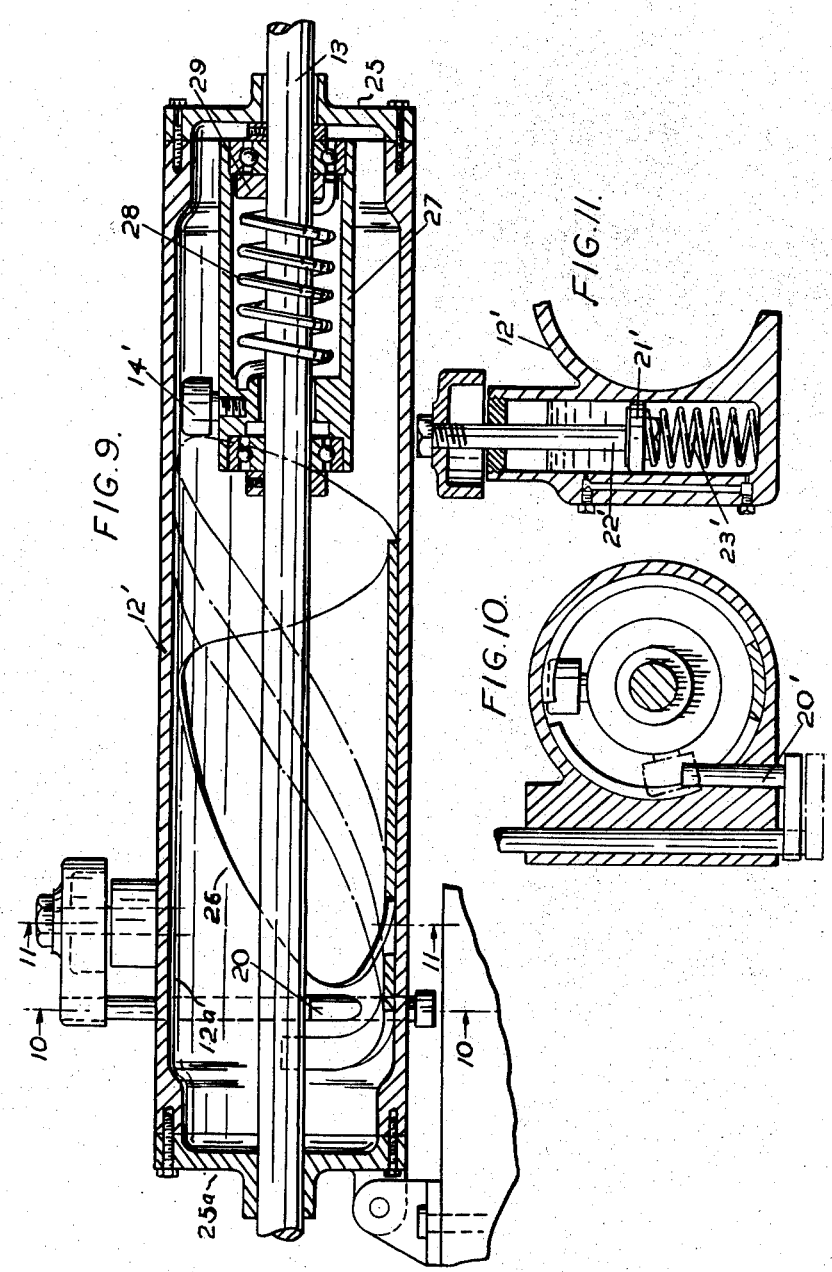

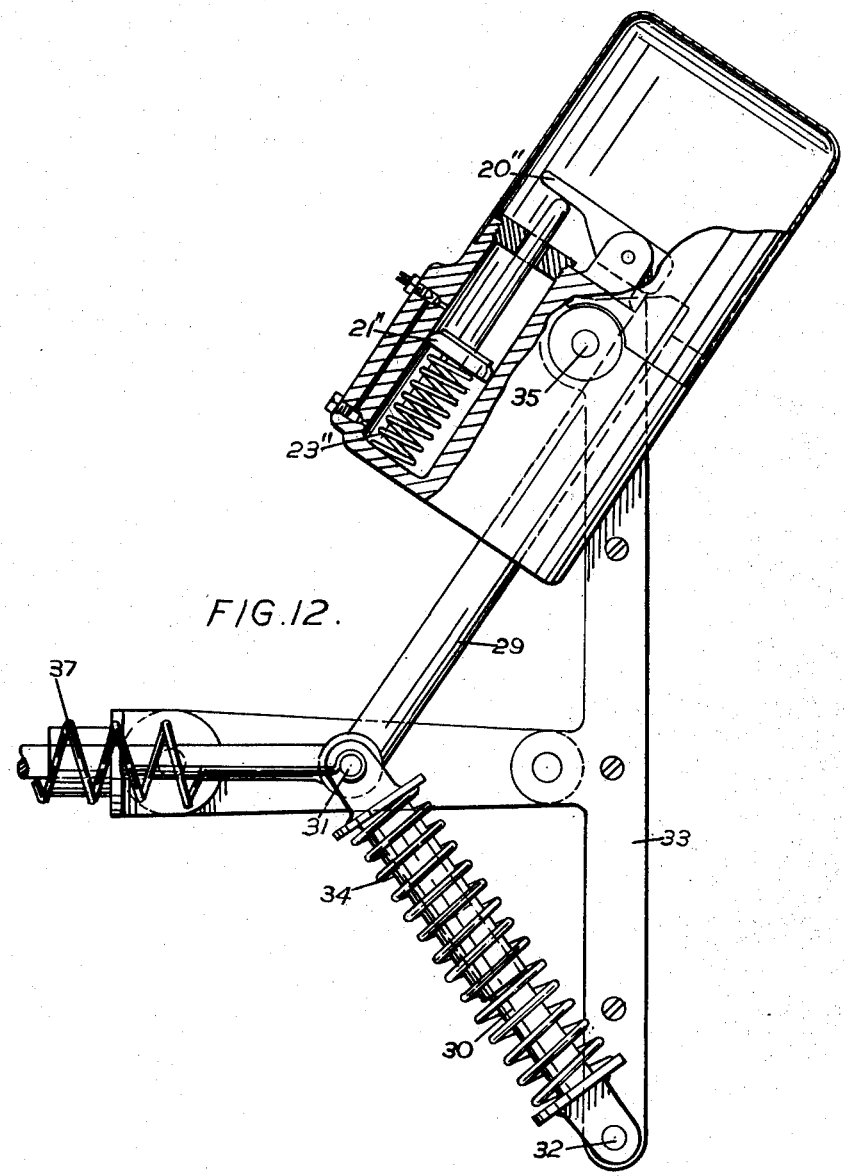

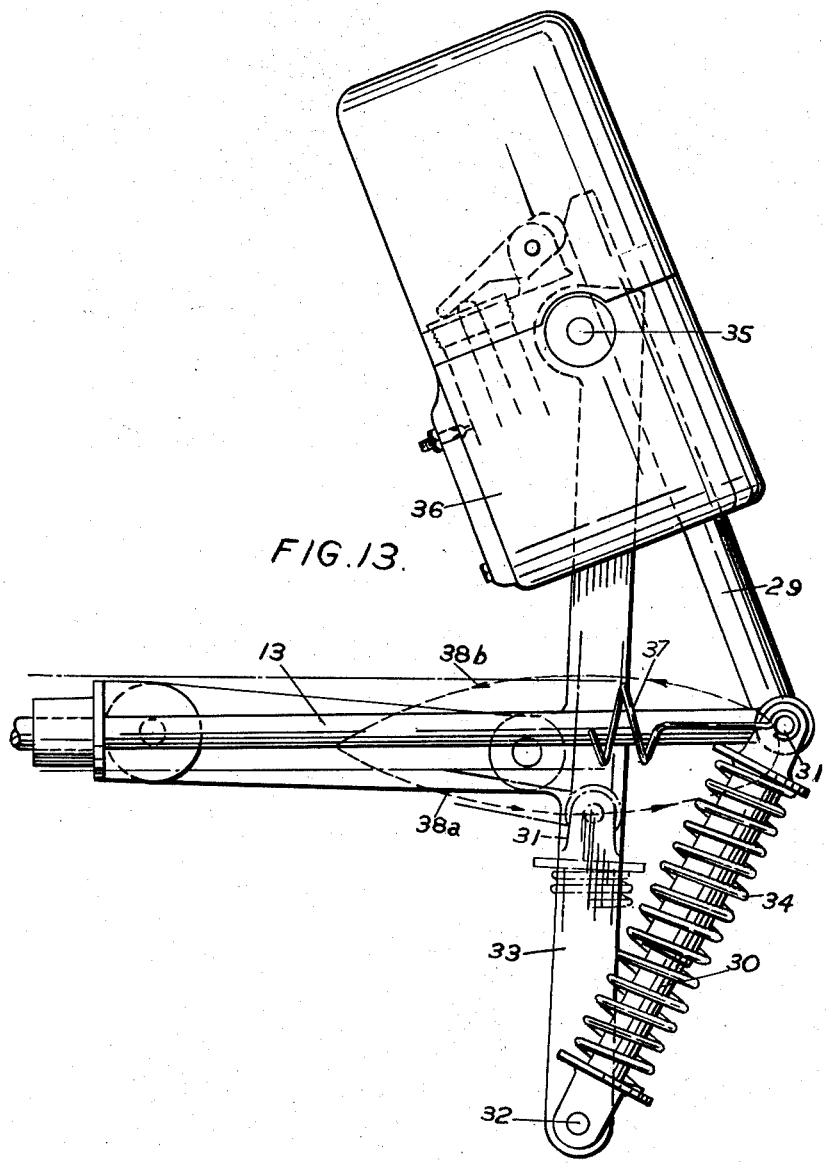

Patented Apr. 22, 1952

2,594,033

UNITED STATES PATENT OFFICE 2,594,033

AUTOMATIC GATE CONTROL

Jack Voyna Leslie Kemp, Tebworth, Leighton Buzzard, England, assignor to Craig Kemp Limited, London, England, a British company Application December 28, 1949, Serial No. 135,339 In Great Britain December 31, 1948

10 Claims. (Cl. 39—40)

This invention relates to automatic gate or door opening mechanism.

Mechanisms of this kind have previously been made in which a movable pad or treadle in the road surface is depressed by the passage of a vehicle and opens the gate through a mechanical linkwork. Such mechanisms have however, the disadvantage that they involve disturbance to the road surface and form an expensive and complicated installation.

It is an object of the invention to obviate these disadvantages and to provide a mechanism which may be substantially self-contained.

In accordance with a feature of the invention a gate or door opening mechanism is provided in which a member is movable relative to the gate or door along differing predetermined paths during the opening and closing movements, the path during the opening movement undergoing change of direction during its travel and the member being biassed to resist the initiation of the opening movement but to continue the latter stages of such movement so that after the gate or door has been positively opened for a certain distance the opening is completed automatically.

A further feature of the invention is a gate or door opening mechanism in which energy is stored in an over-centre spring-loaded device during the early part of the gate opening movement and the energy is released to complete the opening of the gate or door.

A delay device mechanism may be conveniently embodied in the mechanism to hold the gate or door open for a predetermined period and if desired both the opening and closing movements of the door may be effected by a single spring.

Figure 1:
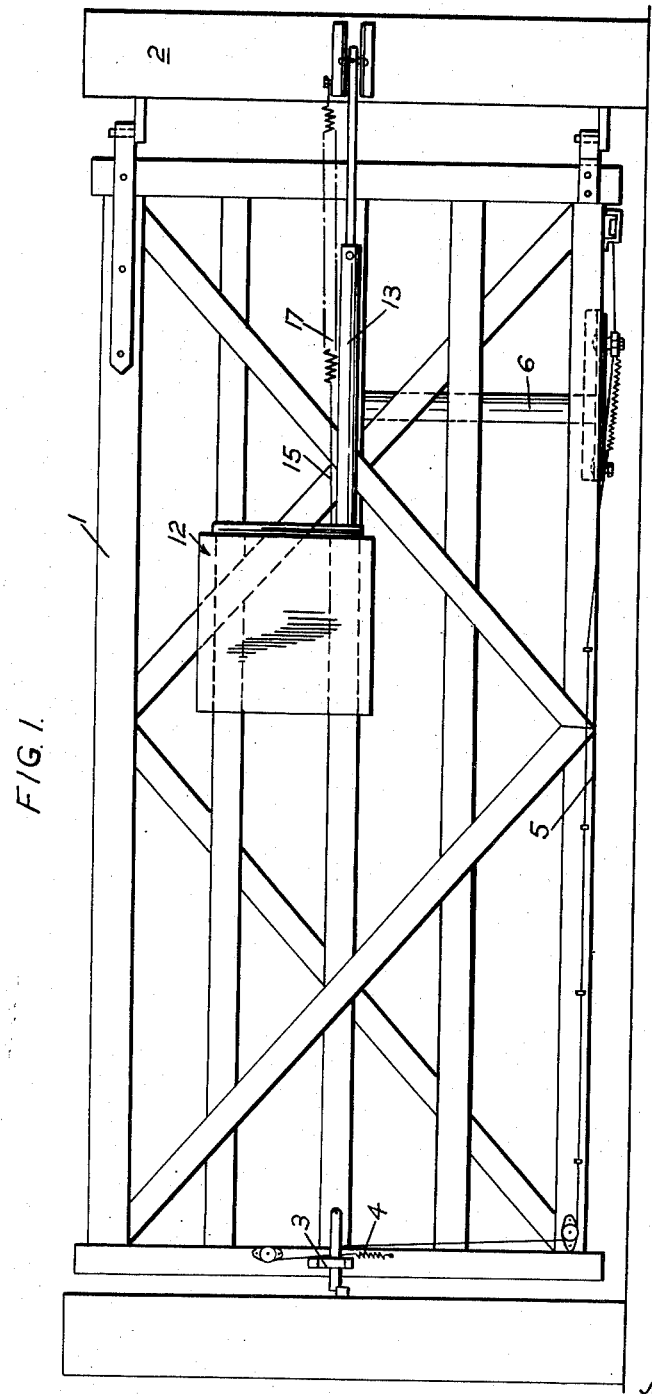

The invention is illustrated in the accompanying drawings in which:

Fig. 1 is a side elevation of a gate opening in one direction only and fitted with one form of the mechanism in accordance with the invention, Fig. 2 is a fragmentary perspective view of the gate from the other side and showing the bumper bar and pivoted pillar to be described in more detail later, Figs. 3 and 4 are two side elevations of the control box of the gate shown in Fig. 1 with the outer cover removed and showing the internal mechanism in different positions, Figs. 5 and 6 are respectively sections along the lines 5—5 and 6—6 of Fig. 4.

Figure 7:
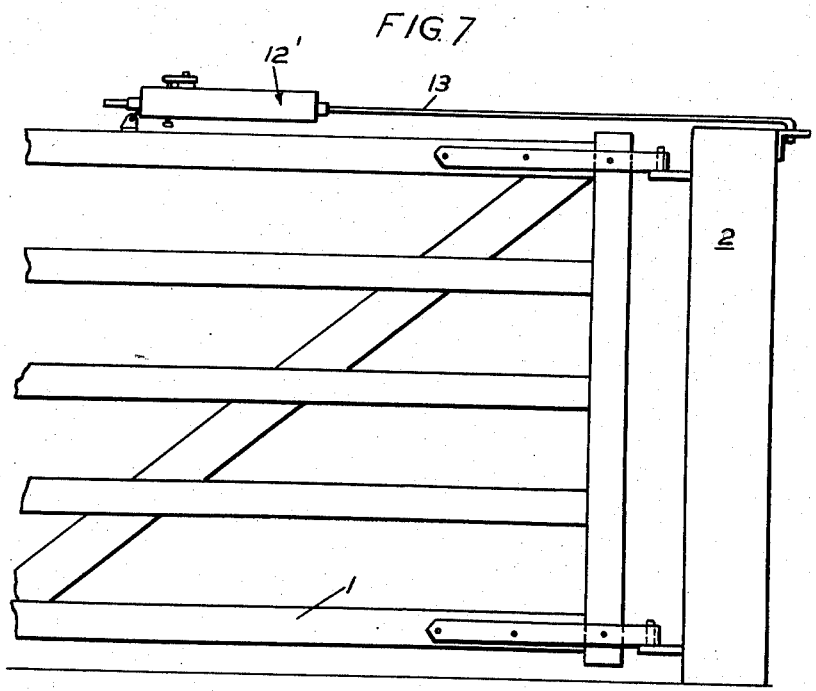

Fig. 7 is a view of a gate opening in either direction and provided with an alternative form of control mechanism.

Figure 8:
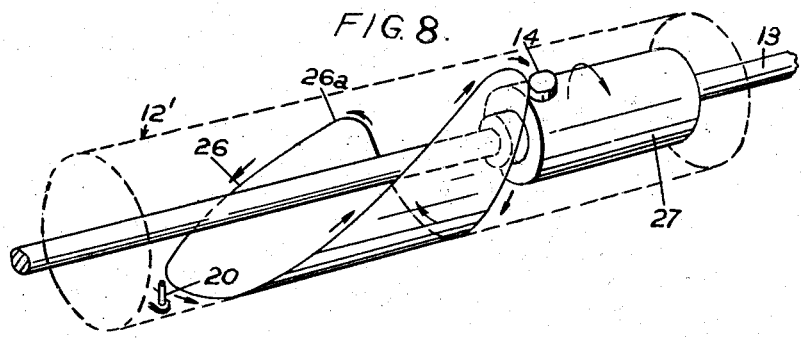

Fig. 8 is an enlarged diagrammatic view of the control box of Fig. 7 showing the functioning of the internal arrangements, Fig. 9 is a longitudinal section of the control box shown in Fig. 7 and Figs. 10 and 11 are sections along the lines 10—10 and 11—11 of Fig. 9, Figs. 12 and 13 are views of a further alternative control in which a second spring is used for closing the gate. In the drawings like parts are given the same reference numerals.

Referring now to Figs. 1 to 6, the gate 1 is hinged from a post 2 and is provided with a latch 3 which is biassed by a spring 4 to hold it closed. The gate is opened by pivoting away from the side shown in Fig. 2. The latch 3 is operably connected by a cable 5 to a bumper bar 6. This connection is made by securing one end of a lever 7a to the bottom of bar 6, the other end of the lever 7a riding on a pin 8a mounted on a block 8b to which cable 5 is fastened. Pin 8a is slidable in a slot 8 in the flange of bracket 9 secured to gate 1. A lever 7 links lever 7a to the opposite end of bracket 9. The upper end of bar 6 is supported in a slotted bracket 9'. A continuation 10 of the cable 5 leads to a pivoted pillar 11 mounted in the ground at any convenient point on the side of the gate opposite the bumper bar 6. It will therefore be appreciated that opening of the gate may be initiated either by pressure of a vehicle approaching the gate from the side shown in Fig. 2 against the bumper bar 6 or by pressure of a vehicle going in the reverse direction against the pillar 11.

The automatic control mechanism comprises a box 12 fixed to the gate 1 and having a connecting rod 13 one end of which is pivoted to the gate post 2 and offset from a plane including the axis of the hinges and the face of the gate and the other end of which is situated within the control box 12 and carries a sheave or roller 14 over which passes a cable 15 which is anchored to the control box at 16. At its other end the cable is connected to a tension spring 17 which is anchored to the gate post 2. Within the control box there is also provided an abutment plate 18 for the roller, which plate is triangular in outline and which provides along its perimeter a triangular track for the movement of the roller, a second guide plate 19 being provided adjacent one side of plate 18 to keep the roller in contact with the triangular track during its return movement. A sliding stop 20 is guided in one end of the plate 19 and is attached at its other end to the plunger 21 of a dashpot having a cylinder 22 filled with oil, and a return spring 23 which returns the plunger 21 quickly, whilst movement to compress the spring 23 is delayed by the dashpot action. The triangular plate 18 also carries a gravity operated pawl 24.

The operation of the device is as follows: When the gate 1 commences to open, being pushed by the bumper bar 6 in response to direct pressure thereon or upon the pillar 11, the roller 14 will commence to ride up the inclined surface of the triangular plate 14, being prevented from moving in the other direction by the pawl 24. This action will tilt the connecting rod 13 and stretch the spring 17 and the initial opening of the gate will therefore store energy in the spring 17. When the roller reaches the point 18a the track abruptly changes direction and in consequence the connecting rod 13 and roller 14 will move downwards to stop 20, thus releasing a part of the energy stored in the spring 17 and completing the opening of the gate 1. This position is shown in Fig. 4 and will be maintained until the pressure of the spring 17 has caused the dashpot plunger 21 to collapse against the spring 23 so that the roller 14 can pass the stop 20. The roller 14 under the pull of spring 17 will then return along the channel between the plates 18 and 19 so closing the gate 1 and will finally pass under the pawl 24 when it will reach the position shown in Fig. 3 the gate being then closed. The dashpot spring 23 will meanwhile have returned the plunger 21 and stop 20.

The form of control mechanism shown in Figs. 7 to 11 is suitable for a gate which opens in either direction and in this case a bumper bar like that shown in Figs. 1 and 2 may be fitted on each side of the gate 1, no remote control pillar 11 being necessary.

With the arrangement shown in Figs. 7 to 11 the connecting rod 13 passes completely through the control box 12.

The control box 12' which is illustrated most fully in Figs. 9 to 11 comprises a cylindrical outer wall having end caps 25 and 25a and within which there is provided a groove which represents the projection of a triangle on to a cylindrical surface. This groove is represented by the line 26 in Fig. 8. Within the outer wall and adjacent cap 25 is a coaxial cylindrical housing 27 mounted to be rotatable upon the connecting rod 13 and carrying a roller 14' engaging the groove 26 in the outer wall. A torsion spring 28 within housing 27 is coiled on the connecting rod 13 and engages one end of the housing 27 and the other end being fastened to collar 29 slidably mounted on the connecting rod 13.

At the other end adjacent cap 25a the control box 12' has an integral dashpot similar to the dashpot of Fig. 3 and having a plunger 21' which carries a stop 20' passing through the outer wall of the control box 12' into the groove 26.

The functioning of this device is most clearly illustrated in the diagrammatic view of Fig. 8. In that view the arrows along the groove 26 represent the direction of travel of the roller 14'.

When the gate is opened the connecting rod 13 is pressed and slides through the control box 12' and the roller 14' is forced along the groove 26 thus causing the cylindrical housing 27 to rotate about shaft 13 axially relative to the control box 12' and storing energy in the torsion spring 28. This action is continued until the roller reaches the point 26a. At this point the groove 26 changes direction and the torsion spring 28 commences to release energy and unwind thus moving the roller 14' along the track until it comes into contact with the stop 20' when the gate will be fully open. The roller 14' then forces the stop 20' out of its path, the movement of the stop being controlled by the dashpot plunger 21' so as to provide a delay whilst the gate 1 is fully open. The roller 14' then returns to its original position in the direction shown by the arrows and thus closes the gate, the energy being provided by the further unwinding of the spring 28.

A still further form of control mechanism is shown in Figs. 12 and 13. In this form two toggle arms 29, 30 are pivoted together at 31 the arm 30 also being pivoted at 32 to a frame 33. The arm 30 is telescopic and biased for extension by a coiled compression spring 34. Also pivoted to the frame 33 at 35 is a housing 36 containing a dashpot like that shown in the preceding embodiments whose plunger 21'' actuates a pivoted stop or abutment 20'' which supports the free end of the toggle arm 29 until it is disengaged by compression of the spring 23''.

An additional tension spring 37 is provided for closing the gate, this spring being weaker than spring 34.

The operation of the device is as follows: When the gate is opened for which purpose a bumper bar and collapsible pillar as shown in Figs. 1 and 2 may be provided, the pivot point 31 is moved to the right from the position shown in Fig. 12 following the track shown in dotted lines 38a in Fig. 13. During the first part of the movement the spring 34 is compressed until the dead centre position is reached (as shown in dotted lines in Fig. 13) after which the spring 34 releases part of its stored up energy bringing the toggle mechanism into the position shown in full lines in Fig. 13 in which position initially the toggle arm will be supported by the pivoted stop 20'' and the gate will be fully opened and held in that position. After the delay provided by the dashpot, the pivoted stop will collapse as shown in Fig. 13 and allow the toggle arm 29 to slide past it and will thus free the gate for closing under the action of the second spring 37 in which energy has been stored during the opening movement. The toggle and pivot 31 will therefore return to the position shown in Fig. 12 along the track 38b indicated in dotted lines in Fig. 13 and after the position shown in Fig. 12 has been reached the dashpot plunger and pivoted stop will be returned under the action of the spring 23.''

I claim:

1. A device for controlling a gate hinged to a gatepost comprising a pivoted toggle adapted to be carried by the gate, a connecting rod adapted to be pivoted to the gatepost and to the centre pivot of the toggle, a spring located to be compressed by movement of the toggle towards the straight position, a fixed abutment for the free end of one limb of the toggle, a movable abutment for the free end of the other limb of the toggle, a spring-biased dashpot for delaying collapse of the movable abutment, and a second and weaker spring for restoring the toggle to its initial position after the movable abutment has collapsed, whereby initial movement of the gate in the opening direction straightens the toggle against the bias of the compression spring, and stores energy for release after the toggle has passed the straight position, which stored energy completes the opening of the gate, and the energy stored in the second spring returns the gate to the closed position after the movable abutment has collapsed.

2. A device for controlling a gate hinged to a gatepost comprising a guide adapted to be secured to the gate, a connecting rod adapted to be pivoted to the gatepost and carrying a roller in engagement with said guide, a spring biassing said connecting rod to engage said roller with the guide throughout the movement of the gate, said guide having a triangular form and having a pivoted pawl at the corner nearest the gatepost to prevent reversal of the movement of the roller round the track, and a movable stop and time delay control means therefor at the corner most remote from the gatepost, whereby during the first part of the gate opening movement the roller is moved from the corner of the guide nearest the gatepost to the adjacent corner and energy is stored in the spring, which energy is released during the remainder of the gate opening movement, to produce said movement, and, after the movable stop has collapsed, to produce the gate-closing movement.

3. A mechanism for automatically opening and closing a gate hinged to a support, said mechanism comprising a member adapted to be secured to the gate and a second member adapted to be secured to the support, the members being relatively movable during the opening and closing movements of the gate, a spring interposed between said members, and an element connected to one of said members for guiding the relative movement between said members on differing continuous paths during said opening and closing movements such that when the gate is opened from the closed position the spring is initially stressed till dead centre position is reached, after which the stress partially is relieved and the opening movement is completed by the further releasing of the spring, and the path during the closing movement being such that the stress of the spring is not increased during the closing movement.

4. A mechanism as in claim 3, further comprising a dashpot controlled stop interposed between said members in the portion of the path corresponding to the open gate position, said stop being movable by one of said members to permit closing movement of said gate.

5. A mechanism as in claim 3, further comprising a second spring adapted to interconnect said gate and said support, said second spring being tensioned upon opening said gate.

6. A mechanism as in claim 3, said element connected to one of said members comprising a body secured to one of said members and having a surface for guiding the other member in a path to effect a progressive release of the stress in said spring to effect the closing of said gate.

7. A mechanism for automatically opening and closing a gate hinged to a support comprising a roller carried by an arm adapted to be pivoted to the support, a triangular guide secured to the gate, and a spring which acts on said arm to urge said roller continuously into contact with one face of said guide, said guide face forming a first path, and a second path so that when said gate is first opened from the closed position the stress of said spring is increased to a maximum and then decreases during the remainder of the opening movement of the gate, while during the closing movement of the gate the roller and guide return to their initial relative positions along said second path during which return movement the residual stress in said spring is progressively released.

8. A mechanism for automatically opening and closing a gate hinged to a support, comprising an arm adapted to be freely pivoted to the support about an axis parallel to the hinge axis of the gate, two concentric sleeves slidably mounted on said arm, the inner sleeve having an external projection rotatable relative to said arm, the outer sleeve being pivotally mounted upon the gate and having an internal guide track forming a closed figure for guiding said projection, a torsion spring having one end anchored to said arm and the other end to said inner sleeve, said track being so shaped that during the initial opening movement of the gate the projection is moved along the track and causes relative rotation of the two sleeves to occur and initially stresses the spring, the direction of relative rotation being reversed during further opening movement to relieve partially stress in the spring, and during the closing movement the projection moves to its starting position over the remainder of the length of the track while residual stress in the spring is released.

9. A mechanism for automatically opening and closing a gate hinged to a support comprising a spring biased toggle having two arms jointed by a pivot point, said toggle being adapted adapted to be secured to the gate, a connecting rod anchored at one end to the support and at the other to the pivot point in the toggle, a dashpot-supported abutment forming a support for one arm of the toggle, a second spring adapted to extend between said support and said gate, the arrangement being such that during opening of the gate from the closed position said toggle passes through the dead centre position, its biasing spring being first stressed and the stress being later released to complete the opening of the gate, the second spring being stressed during the opening movement of the gate, said dashpot-supported abutment collapsing after a predetermined time interval to render the toggle inoperative and to permit the gate to return to the closed position under the action of the second spring without again stressing the toggle biasing spring.

10. A mechanism as in claim 8, said guide track having substantially the shape of a triangle projected upon a cylinder.

JACK VOYNA LESLIE KEMP.

REFERENCES CITED

The following references are of record in the file of this patent:

UNITED STATES PATENTS

| Number | Name | Date |
|---|---|---|
| 527,693 | Hurst | Oct. 16, 1894 |
| 1,033,746 | Smithson | July 23, 1912 |
| 2,045,207 | Spooner | June 23, 1936 |
| 2,086,061 | Barr | July 6, 1937 |

FOREIGN PATENTS

| Number | Country | Date |
|---|---|---|
| 13,609 | Australia | Mar. 20, 1929 |